United States Patent
Inao et al.

(10) Patent No.: US 9,699,590 B2
(45) Date of Patent: Jul. 4, 2017

(54) WIRELESS COMMUNICATION APPARATUS, WIRELESS COMMUNICATION METHOD, COMPUTER-READABLE RECORDING MEDIUM, AND WIRELESS COMMUNICATION SYSTEM

(71) Applicant: FUJITSU LIMITED, Kawasaki-shi, Kanagawa (JP)

(72) Inventors: Yuichi Inao, Fukuoka (JP); Tatsuya Soneda, Fukuoka (JP); Makoto Kawatoko, Onga (JP); Hidefumi Takaoka, Fukuoka (JP); Kenji Yamada, Onojou (JP)

(73) Assignee: FUJITSU LIMITED, Kawasaki (JP)

( * ) Notice: Subject to any disclaimer, the term of this patent is extended or adjusted under 35 U.S.C. 154(b) by 239 days.

(21) Appl. No.: 14/318,884

(22) Filed: Jun. 30, 2014

(65) Prior Publication Data

US 2015/0009859 A1    Jan. 8, 2015

(30) Foreign Application Priority Data

Jul. 4, 2013   (JP) ................................. 2013-140800

(51) Int. Cl.
*H04L 12/28*    (2006.01)
*H04W 4/00*    (2009.01)
(Continued)

(52) U.S. Cl.
CPC ........... *H04W 4/005* (2013.01); *H04W 40/24* (2013.01); *H04W 84/18* (2013.01)

(58) Field of Classification Search
CPC ...................................................... H04L 41/12
(Continued)

(56) References Cited

U.S. PATENT DOCUMENTS

| | | | |
|---|---|---|---|
| 2008/0175257 A1* | 7/2008 | Winter | ................ H04W 40/248 370/411 |
| 2010/0017646 A1* | 1/2010 | Nakagawa | .......... G06F 11/2028 714/4.1 |
| 2014/0016645 A1 | 1/2014 | Nomura et al. | |

FOREIGN PATENT DOCUMENTS

| | | |
|---|---|---|
| CN | 102045234 | 5/2011 |
| JP | 10-93608 A | 4/1998 |

(Continued)

OTHER PUBLICATIONS

Japanese Office Action mailed Jan. 30, 2017 for corresponding Japanese Patent Application No. 2013-140800, with Partial English Translation, 5 pages.

(Continued)

*Primary Examiner* — Shripal Khajuria
(74) *Attorney, Agent, or Firm* — Fujitsu Patent Center

(57) ABSTRACT

A wireless communication apparatus stores therein, in an associated manner, each piece of path information on a plurality of destinations and a use frequency of data communication that is performed by using the path information. When the wireless communication apparatus receives data whose send source is a first destination, the wireless communication apparatus specifies, on the basis of the use frequency, path information that is less frequently used from among the pieces of the stored path information. The wireless communication apparatus updates the specified path information to path information whose destination is the first destination.

6 Claims, 14 Drawing Sheets

(51) Int. Cl.
  *H04W 40/24*    (2009.01)
  *H04W 84/18*    (2009.01)
(58) Field of Classification Search
  USPC .......................................................... 370/254
  See application file for complete search history.

(56) References Cited

FOREIGN PATENT DOCUMENTS

| | | |
|---|---|---|
| JP | 2010-232967 A | 10/2010 |
| JP | 2011-097458 A | 5/2011 |
| JP | 2012-209741 | 10/2012 |

OTHER PUBLICATIONS

CNOA—Notification of the First Office Action issued on May 2, 2017 for Chinese Patent Application No. 201410311163.1, with English translation.

\* cited by examiner

| SPECIFIED GW | | | GW1 | |
|---|---|---|---|---|
| GD | LD | TTL | QUALITY | PATH TIMER |
| GW1 | GW1 | 25 | 40 | 100 |
| GW2 | NODE C | 25 | 80 | 60 |

FIG.12
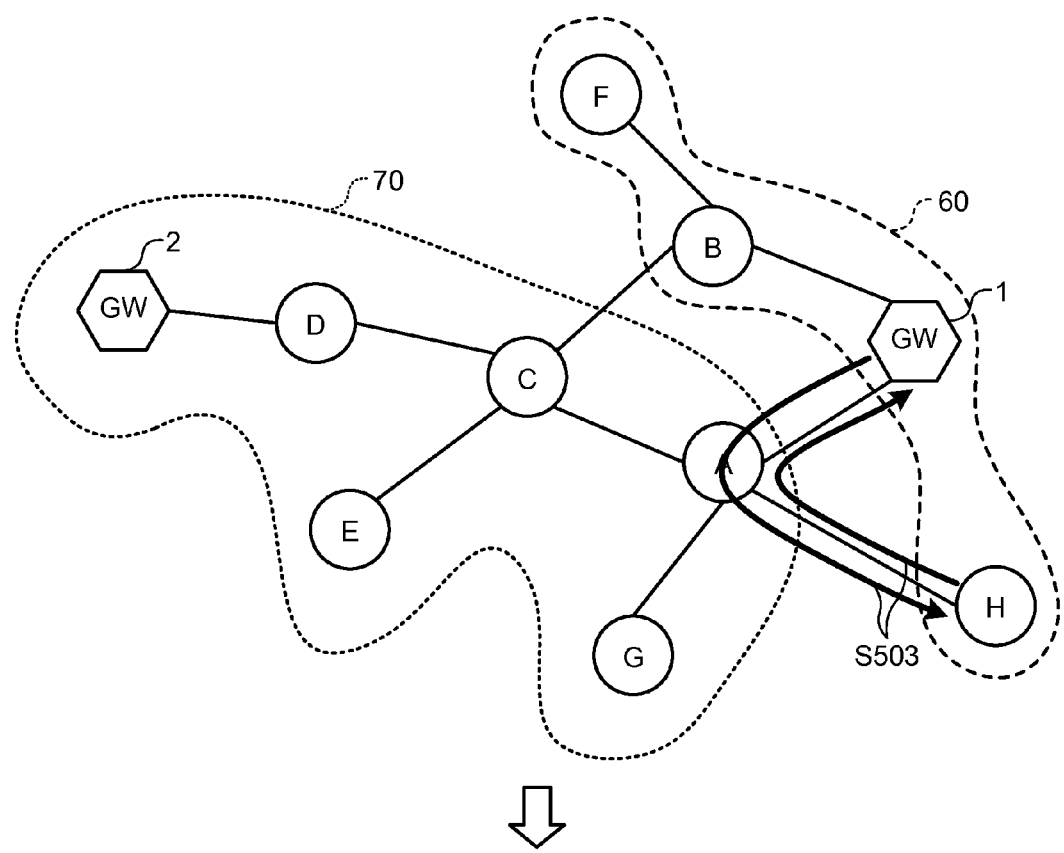
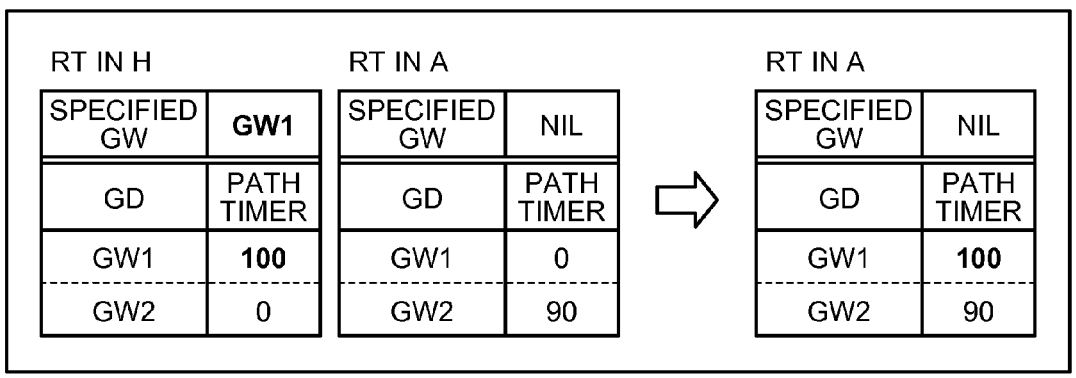

WIRELESS COMMUNICATION APPARATUS, WIRELESS COMMUNICATION METHOD, COMPUTER-READABLE RECORDING MEDIUM, AND WIRELESS COMMUNICATION SYSTEM

CROSS-REFERENCE TO RELATED APPLICATION

This application is based upon and claims the benefit of priority of the prior Japanese Patent Application No. 2013-140800, filed on Jul. 4, 2013, the entire contents of which are incorporated herein by reference.

FIELD

The embodiments discussed herein are directed to a wireless communication apparatus, a wireless communication method, a wireless communication program, and a wireless communication system.

BACKGROUND

There is a conventionally known wireless communication system that collects data from wireless terminals by using wireless ad hoc networks. For example, a system that collects meter read data is used by arranging wireless terminals in meter read meters that read electrical power used in homes.

Because such wireless terminals are usually arranged in a fixed manner, the wireless terminals learn path information by using a proactive-type routing protocol. Specifically, by periodically sending and receiving a control message between adjacent terminals connected by a single hop, the wireless terminals measure the quality of paths between nodes and retain, in their own routing table, multiple paths to the final destination in descending order of the quality of the paths. In recent years, because memory saving for wireless terminals is improved, the upper limit of the number of entries that can be registered in the routing table is set.

Patent Document 1: Japanese Laid-open Patent Publication No. 10-93608

Patent Document 2: Japanese Laid-open Patent Publication No. 2010-232967

Patent Document 3: Japanese Laid-open Patent Publication No. 2011-097458

However, with the technology described above, when an entry needs to be updates, because the upper limit of the number of entries in the routing table is set, a path that is frequently used may sometimes not able to be retained due to the update of the entry. Consequently, in some cases, communication disconnection may possibly occur.

SUMMARY

According to an aspect of the embodiment, a wireless communication apparatus includes a memory configured to store therein, in an associated manner, each piece of path information on a plurality of destinations and a use frequency of data communication that is performed by using the path information; and a processor connected to the memory. The processor executes a process including specifying, on the basis of the use frequency when data whose send source is a first device is received, path information, which is less frequently used from among the pieces of the path information stored in the memory; and updating the specified path information to path information whose destination is the first device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is a schematic diagram illustrating an example in which the path information is updated by a frame that is sent from the GW device 1 to a node H from the state illustrated in FIG. 11;

DESCRIPTION OF EMBODIMENTS

Preferred embodiments of the present invention will be explained with reference to accompanying drawings. The present invention is not limited to these embodiments. The embodiments or specific examples can be appropriately used in combination as long as the processes do not conflict with each other.

[a] First Embodiment

Overall Configuration

Figure 1:
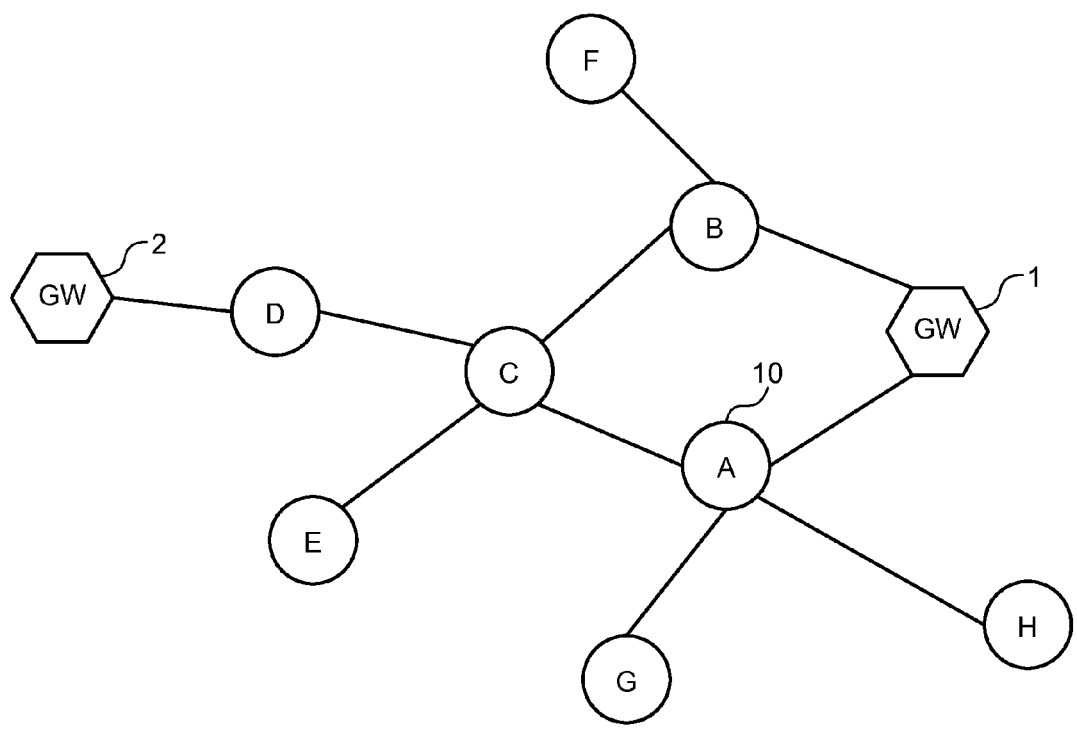
FIG. 1 is a schematic diagram illustrating an example of the overall configuration of a wireless communication system according to a first embodiment.

FIG. 1 is a schematic diagram illustrating an example of the overall configuration of a wireless communication system according to a first embodiment. As illustrated in FIG. 1, the wireless communication system is a system that includes nodes, i.e., from a node A to a node H, a gateway (GW) device 1, and a GW device 2.

For example, a management server that collects data from each of the nodes is connected to the GW device 1 and the GW device 2. Each of the nodes is a wireless terminal that acquires data from a meter used to read, for example, a value of electrical power used in a home and that sends the data to the management server connected to one of the GW devices. Furthermore, in order to use less memory, the upper limit of the number of entries that can be registered in the routing table is set in each of the nodes.

Each of the nodes in the wireless communication system learns path information by using a proactive-type routing protocol. Specifically, by periodically sending and receiving a control message between adjacent terminals connected by a single hop, each of the nodes measures the quality of paths between nodes and retains, in a routing table, multiple paths to the final destination in descending order of the quality of the paths.

In this state, each of the nodes stores therein, in an associated manner, path information on the multiple GW devices and use information on the path information that is used for data communication. Then, when each of the nodes relays data whose send source is a predetermined GW device, each of the nodes specifies, on the basis of the use information, path information that is less frequently used from among the pieces of stored path information. Then, each of the nodes updates the specified path information to path information whose destination is the predetermined GW device.

As described above, each of the nodes stores therein, in an associated manner, the use frequency and path information to be sent to a GW. When each of the nodes adds new path information, because each of the nodes deletes information with the lowest use frequency and then adds the new path information, the node can retain path information with a high use frequency and thus can suppress the degradation of the quality of wireless communication.

Hardware Configuration

Figure 2:
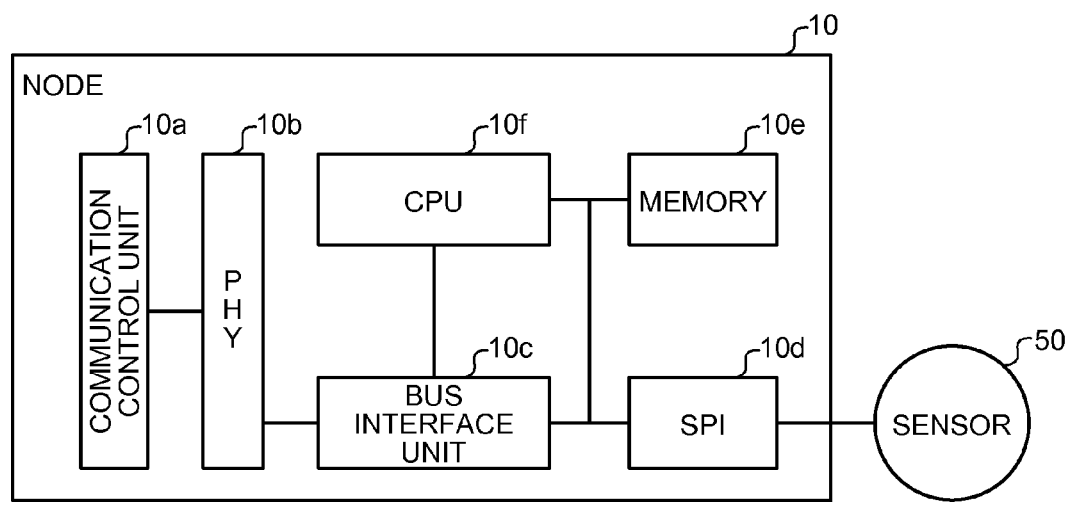
FIG. 2 is a schematic diagram illustrating an example of the hardware configuration of a node according to the first embodiment.

FIG. 2 is a schematic diagram illustrating an example of the hardware configuration of a node according to the first embodiment. Because the nodes illustrated in FIG. 1 each have the same configuration, in the first embodiment, a node 10 will only be described. Furthermore, because each of the GW devices has the same hardware configuration as that of a typically used GW device, a description thereof in detail will be omitted.

As illustrated in FIG. 2, the node 10 includes a communication control unit 10a, a physical layer (PHY) 10b, a bus interface unit 10c, a serial peripheral interface (SPI) 10d, a memory 10e, and a central processing unit (CPU) 10f.

The communication control unit 10a is a processing unit that executes communication with the other node or a GW device and is, for example, an antenna or a network interface card. The PHY 10b is a hardware unit in the physical layer and implements communication with a counterpart device via the communication control unit 10a because an operation related to network connection or data transmission in the physical layer is stipulated. Furthermore, the PHY 10b may also be implemented by software.

The bus interface unit 10c is a bus interface for exchanging a signal among the CPU 10f, the memory 10e, the PHY 10b, the SPI 10d, and the like. The SPI 10d is an interface for connecting the node 10 to a sensor 50. Various kinds of sensor may also be used for the sensor 50. For example, a meter that is used to read electrical power or the like may be used and may also be embedded in the node 10.

The memory 10e is a storage device, such as a read only memory (ROM), a random access memory (RAM), or the like, that stores therein a program that is used to implement various processes in the communication method according to the first embodiment, a routing table, which will be described later, or data that is obtained in the course of a process. The CPU 10f is a processing unit that manages various processes performed by the node 10 and executes various processes in the communication method according to the first embodiment.

Functional Configuration

Figures 3, 4:
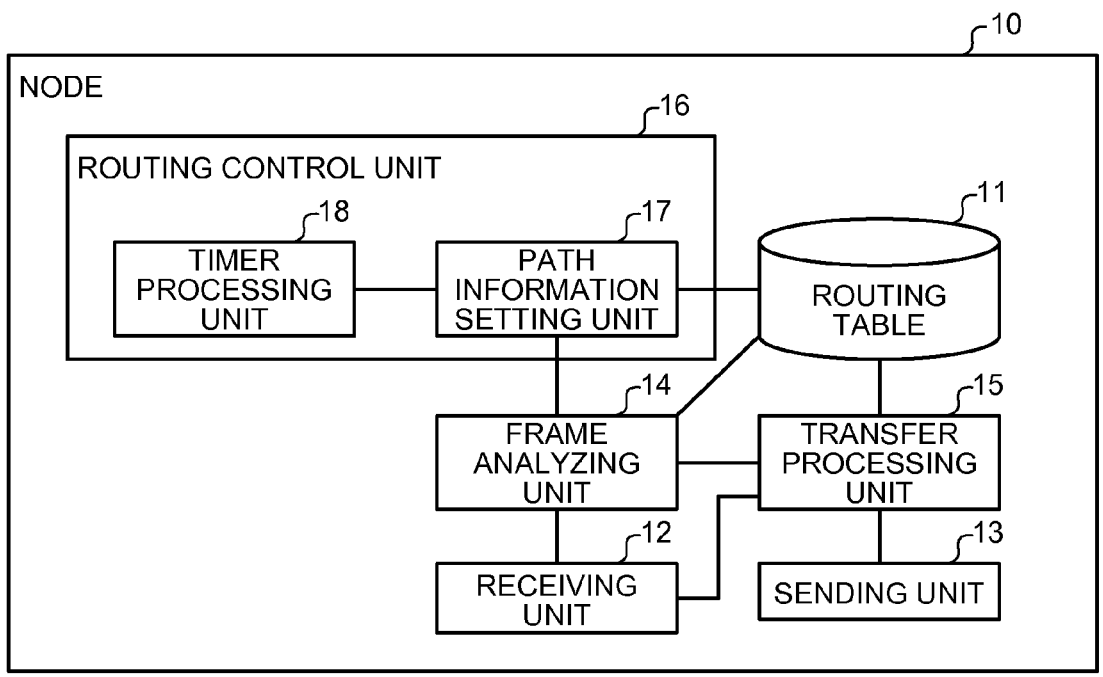
FIG. 3 is a functional block diagram illustrating the functional configuration of the node according to the first embodiment.
FIG. 4 is a schematic diagram illustrating an example of information stored in a routing table.

FIG. 3 is a functional block diagram illustrating the functional configuration of the node according to the first embodiment. Because the nodes illustrated in FIG. 1 each have the same configuration, in the embodiment, the node 10 will only be described.

As illustrated in FIG. 3, the node 10 includes a routing table 11, a receiving unit 12, a sending unit 13, a frame analyzing unit 14, a transfer processing unit 15, and a routing control unit 16.

For example, the routing table 11 is stored in a storage device, such as the memory or the like, illustrated in FIG. 2. The receiving unit 12 and the sending unit 13 are processes executed by circuits included in the communication control unit 10a or an example of the process executed by the communication control unit 10a illustrated in FIG. 2. Similarly, the frame analyzing unit 14, the transfer processing unit 15, and the routing control unit 16 are processes executed by a circuit included in the CPU 10f or an example of the process executed by the CPU 10f illustrated in FIG. 2.

The routing table 11 is a table that stores therein path information on a path to a GW device. FIG. 4 is a schematic diagram illustrating an example of information stored in a routing table. As illustrated in FIG. 4, the routing table 11 stores therein, in an associated manner, "the specified GW, the global destination (GD), the local destination (LD), the time to live (TTL), the quality, and the path timer".

The "specified GW" stored in this table is information that indicates the destination of meter read data that is specified by, for example, an administrator. The "GD" is information that indicates a GW device used as the final destination. The "LD" is information that indicates the subsequent destination when data is to be relayed to the final destination (GD). The "TTL" is a valid counter for an entry, is reset when a survival check frame is received from the GD, and is subjected to subtraction of an elapsed time. The "quality" is information that indicates the quality of a path. The "path timer" is an example indicating a use frequency of path information. The "path timer" is reset when a frame addressed to the GD is transferred and the value thereof is subjected to subtraction of an elapsed time.

FIG. 4 illustrates an example of a routing table that is stored by the node A. In the example illustrated in FIG. 4, the "GW device 1" is specified, as a specified GW, for the node A. Furthermore, the node A stores therein, as a path to the GW device 1, information indicating the LD of "GW 1", the TTL of "25", the quality of "40", and the path timer of "100". Furthermore, the node A stores therein, as a path to the GW device 2, information indicating the LD of "node C", the TTL of "25", the quality of "80", and the path timer of "60".

Specifically, the node A frequently uses the path, to the GW device 1, that has a good quality and through which the node A can connect to the GW device 1 by a single hop. Furthermore, when the node A sends a frame to the GW device 2, the node A sends the frame via the node C and does not use the path to the GW device 2, for 40 minutes, the quality of which is lower than the quality of the path to the GW device 1.

The receiving unit 12 is a processing unit that receives a frame. Specifically, the receiving unit 12 receives a frame sent from each node or from a GW device and outputs the frame to the frame analyzing unit 14 or the transfer processing unit 15.

For example, the receiving unit 12 receives a request frame that is a frame sent from a GW device to the other node or a frame sent from a GW device to its own node. Furthermore, the receiving unit 12 receives a notification frame that is a response to the request frame. Furthermore, the receiving unit 12 receives a survival check frame that is sent from a GW device or the other node and that indicates the survival of a node.

The sending unit 13 is a processing unit that sends a frame. Specifically, the sending unit 13 sends a frame, which has been sent to the other node, to the subsequent destination node and sends a frame addressed to a GW device. For example, the sending unit 13 sends a frame to a path instructed by the transfer processing unit 15.

The frame analyzing unit 14 is a processing unit that analyzes a frame received by the receiving unit 12. Specifically, the frame analyzing unit 14 analyzes whether the received frame is a request frame or a notification frame and analyzes whether the received frame is to be sent to its own node or to the other node. Then the frame analyzing unit 14 outputs the frame and the analysis result to the routing control unit 16 or the transfer processing unit 15.

For example, if the send source of the received frame is a GW device, the frame analyzing unit 14 determines that the received frame is a request frame. Furthermore, if the destination of the received frame is a GW device, the frame analyzing unit 14 determines that the received frame is a notification frame.

The transfer processing unit 15 is a processing unit that transfers a frame to a destination. Specifically, the transfer processing unit 15 specifies, from the routing table 11, path information that is associated with the destination of the frame to be sent and then outputs, to the sending unit 13, an instruction to transfer the frame to the destination by using the specified path information. Furthermore, when the transfer processing unit 15 transfers the notification frame, the transfer processing unit 15 resets the path timer for the path associated with the notification frame.

For example, if the received frame is a request frame, the transfer processing unit 15 specifies the destination of the request frame from the routing table 11 and transfers the request frame to the LD that is associated with the specified destination. Furthermore, when the transfer processing unit 15 sends a notification frame that is associated with the received request frame, the transfer processing unit 15 specifies, from the routing table 11, a path in which the send source of the request frame is the GD and then transfers the notification frame to the LD that is associated with the specified destination. Furthermore, the transfer processing unit 15 resets the "path timer" that is associated with the "GW device" that is set for the destination of the notification frame.

The routing control unit 16 is a processing unit that includes a path information setting unit 17 and a timer processing unit 18 and that executes an update of the routing table or the like.

The path information setting unit 17 is a processing unit that updates the path information in the routing table 11. Specifically, when the path information setting unit 17 receives a request frame sent from a GW device, the path information setting unit 17 creates, in the routing table 11, path information indicating that the "GW" that is the send source of the request frame is the "GD".

At this point, when the number of entries in the routing table 11 reaches the upper limit, the path information setting unit 17 deletes an entry with the smallest "path timer" from among the entries in the routing table 11 and then registers a new entry. Furthermore, when the path information setting unit 17 registers a new entry, the path information setting unit 17 sets an initial value of, for example, 25, for the TTL.

Furthermore, by periodically sending and receiving a control message, such as a HELLO message, to and from an LD in each entry, the path information setting unit 17 measures the quality and stores the result thereof in the routing table 11. The path information setting unit 17 also performs a subtraction of the TTL with respect to each entry stored in the routing table 11.

Furthermore, if the destination of the received request frame is its own node, the path information setting unit 17 stores path information in the routing table 11 and registers, as the specified GW, the send source of the request frame in the routing table 11.

Furthermore, if the path information setting unit 17 receives a survival check frame that is periodically sent from a GW device stored in the routing table 11, the path information setting unit 17 sets an initial value of, for example, "100", in the TTL that is associated with the GW device of the send source of the survival check frame and resets the TTL. In contrast, if the path information setting unit 17 does not periodically receive a survival check frame for a certain time period, the path information setting unit 17 sets the TTL for the corresponding GW device in an entry to zero.

The timer processing unit 18 is a processing unit that processes a path timer in each entry stored in the routing table 11. Specifically, the timer processing unit 18 performs subtraction, for example, every minute, on a path timer in each entry stored in the routing table 11. Furthermore, if the timer processing unit 18 receives a notification from the path information setting unit 17 indicating that a survival is not able to be checked, the path information setting unit 17 sets the path timer in the target entry to zero.

When the timer processing unit 18 receives a notification from the path information setting unit 17 indicating that the GD of the entry to be deleted is a specified GW, the timer processing unit 18 registers another GW device as the specified GW. For example, from among the entries stored in the routing table 11, the timer processing unit 18 sets, as a new specified GW, the GD with the highest quality in an entry or a path timer with the greatest value in an entry.

Example of Updating the Routing Table

Figure 5:
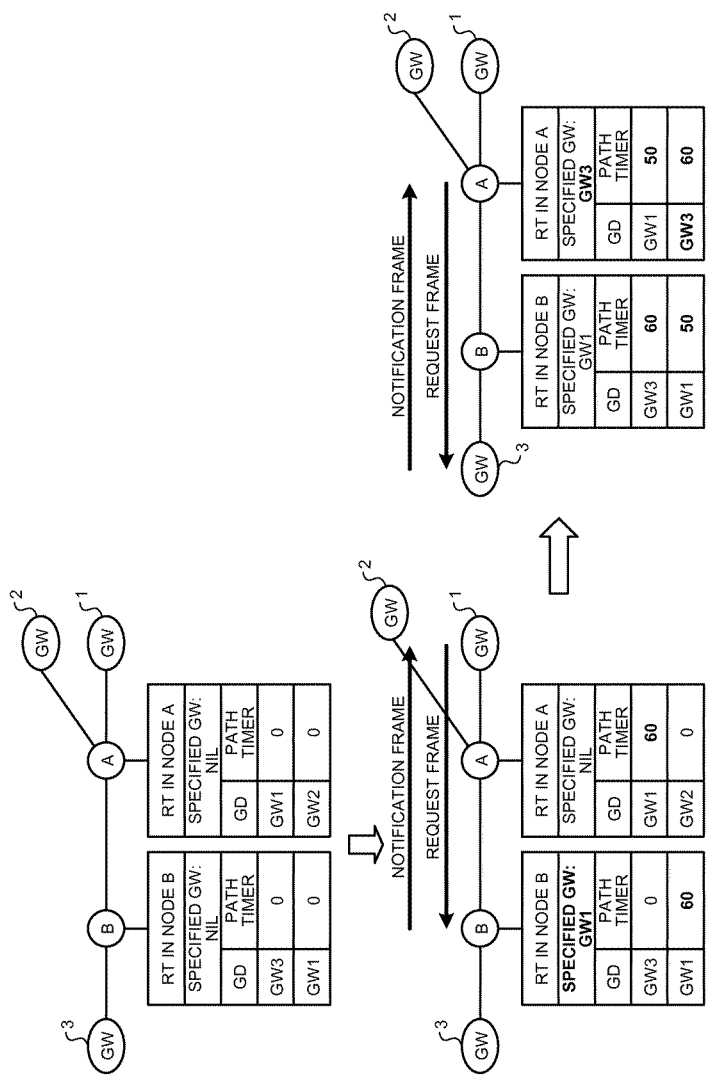
FIG. 5 is a schematic diagram illustrating an update of the routing table.

FIG. 5 is a schematic diagram illustrating an update of the routing table. The wireless network illustrated in FIG. 5 includes the node A, the node B, the GW device 1, the GW device 2, and a GW device 3. Each of the node A and the node B has the same configuration as that illustrated in FIG. 3. The node A and the node B, the node A and the GW device 1, the node A and the GW device 2, and the node B and the GW device 3 are located in a single-hop location each other. Furthermore, it is assumed that the upper limit of the number of entries stored in the routing table in the node is two.

The node A retains, in the routing table as an initial state, information indicating "specified GW=nil and (GD, path timer)=(GW 1, 0) and (GW 2, 0)". Similarly, the node B retains, in the routing table as an initial state, information indicating "specified GW=nil and (GD, path timer)=(GW 3, 0) and (GW 1, 0)". In this example, for ease of description, the routing table is simplified.

In this state, the GW device 1 sends a request frame, such as a request for meter read data, to the node B. The node A that is located in a single hop from the GW device 1 receives the request frame sent from the GW device 1. Then, the node A transfers the received request frame to the node B that is the destination.

Thereafter, the node B that is located in a single hop from the node A receives the request frame that was relayed by the node A. Then, the node B specifies that the destination of the request frame is its own node and specifies that the send source of the request frame is the "GW 1". Consequently, because the destination of the request frame is its own node, the node B sets the "GW 1" for a specified GW.

Then, the node B sends, as a response to the request frame, the notification frame including the meter read data or the like to the GW device 1. At this point, the node B refers to the routing table 11 and sets the "path timer" in an entry, in which the "GW 1" that is the destination of the notification frame is used as the "GD", to the initial value of "60".

Furthermore, the node A that is located in a single hop from the node B receives the notification frame sent by the node B and then relays the notification frame to the GW device 1 that is the destination. At this point, the node A specifies, from the header or the like in the received notification frame, that the send source is the "node B" and the destination is the "GW 1". Then, the node A refers to the routing table and sets the "path timer" in an entry, in which the "GW 1" that is the destination of the notification frame is used as the "GD", to the initial value "60".

It is assumed that, after 10 minutes later, a request frame is sent from the GW device 3 to the node A. Accordingly, in the routing table in each of the node A and the node B, for an entry for the "GW 1", the value of the path timer becomes "50" by 10 minutes being subtracted.

Then, the node B located in a single hop from the GW device 3 receives the request frame. At this point, the node B specifies, from the header or the like in the received request frame, that the send source is the "GW 3" and the destination is the "node A". Then, the node B sends, by using a broadcast or the like, the received request frame to the node A at the destination.

Thereafter, the node A that is located in a single hop from the node B receives the request frame that is relayed by the node B. Then, the node A specifies that the destination of the request frame is its own node and specifies that the send source of the request frame is the "GW 3". Consequently, because the destination of the request frame is its own node, the node A sets the "GW 3" for a specified GW.

Subsequently, the node A sends, as a response to the request frame, a notification frame that includes meter read data or the like to the GW device 3. At this point, the node A refers to the routing table 11 and creates an entry in which the "GW 3" that is the send source of the request frame is used as the "GD".

Specifically, because an entry indicating "GD=GW 1" and an entry indicating "GD=GW 2" are present in the routing table, the node A determines that the number of entries reaches the upper limit. Thus, the node A compares the information indicating "path timer=50" in the entry indicating "GD=GW 1" with the information indicating "path timer=0" in the entry indicating "GD=GW 2" and determines that the specified GW is not the GW 2. Consequently, the node A deletes the entry indicating "GD=GW 2". Then, the node A sets the "GW 3" that is the send source of the request frame as the "GD" and creates, in the routing table, an entry in which the initial value of "60" is set in the "path timer".

Thereafter, the node B located in a single hop from the node A receives a notification frame that has been sent from the node A. Then, the node B specifies that the destination of the notification frame is the "GW 3" and specifies that the send source of the notification frame is the "node A". Consequently, the node B refers to the routing table 11 and then sets the initial value of "60" in the "path timer" in the entry in which the "GW 3" that is the destination of the notification frame is used as the "GD".

As described above, because each of the nodes can update an entry on the basis of the use frequency of each entry stored in the routing table, it is possible to retain, with priority, an entry that is frequently used.

Flow of a Process

In the following, the flow of a process performed by each of the nodes will be described. A description will be given of a frame receiving process that is performed when a frame is received, a path information setting process that updates the routing table, a transfer process that transfers a frame to the destination, and a timer process that controls a path timer included in path information. Furthermore, a description will be given by also using the node 10 as an example node.

Frame Receiving Process

Figure 6:
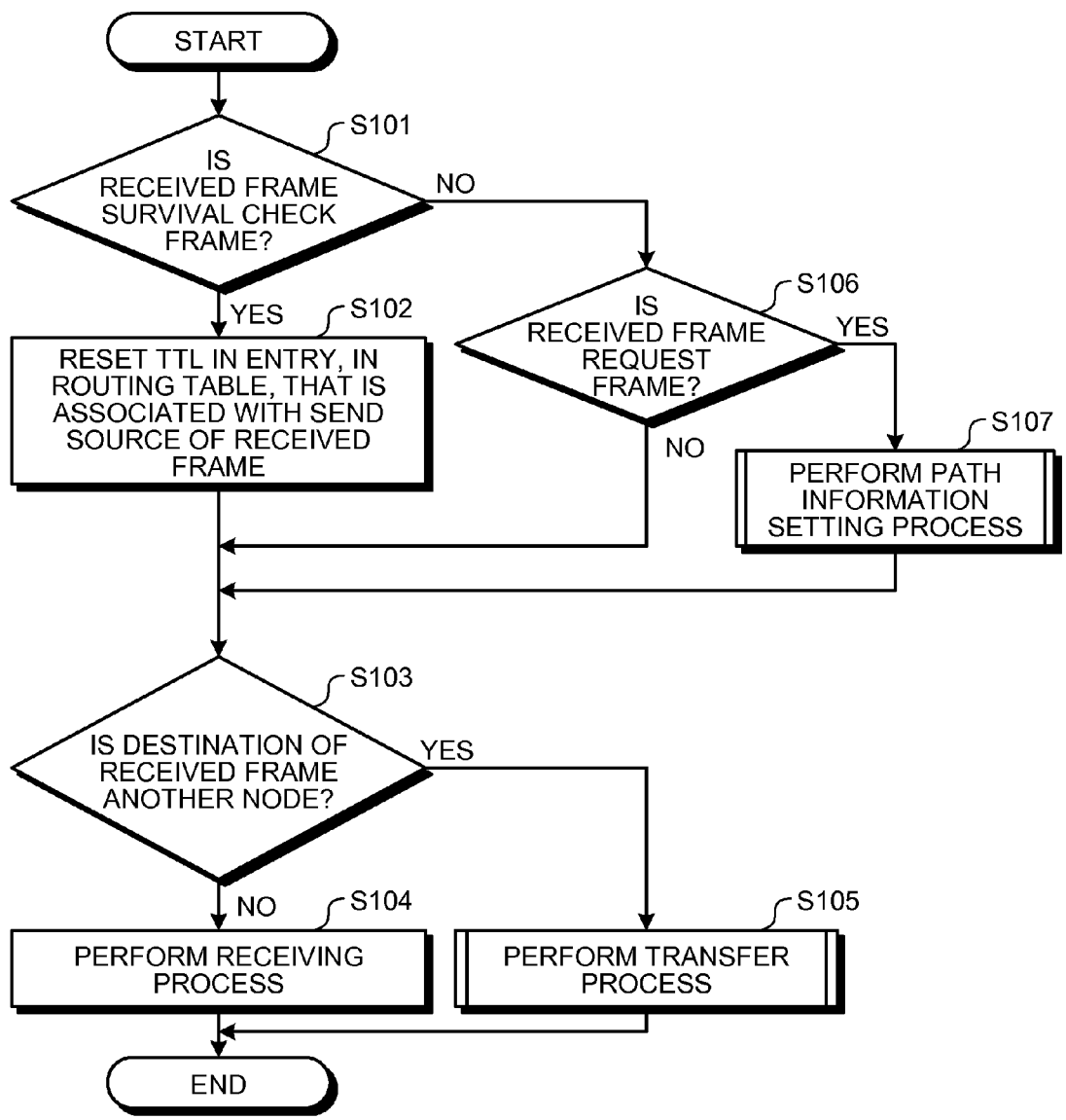
FIG. 6 is a flowchart illustrating the flow of a frame receiving process according to the first embodiment.

FIG. 6 is a flowchart illustrating the flow of a frame receiving process according to the first embodiment. As illustrated in FIG. 6, when the receiving unit 12 in the node 10 receives a frame, the frame analyzing unit 14 determines whether the received frame is a survival check frame (Step S101). For example, the frame analyzing unit 14 refers to the header or the like in the received frame and then determines whether an identifier or the like that indicates a survival check frame is included.

If the path information setting unit 17 determines that the frame is a survival check frame (Yes at Step S101), the path information setting unit 17 resets the TTL in the entry, in the routing table 11, that is associated with the send source of the received frame (Step S102).

Subsequently, if the frame analyzing unit 14 determines that the destination of the received frame is the node 10 itself (No at Step S103), the node 10 performs the receiving process (Step S104). For example, the node 10 acquires meter read data from the sensor 50, creates a notification frame, and then sends the created notification frame.

In contrast, if the frame analyzing unit 14 determines that the destination of the received frame is the other node (Yes at Step S103), the transfer processing unit 15 performs the transfer process, which will be described later (Step S105).

Furthermore, at Step S101, if the frame analyzing unit 14 determines that the received frame is not a survival check frame (No at Step S101), the frame analyzing unit 14 determines whether the received frame is a request frame (Step S106).

If the path information setting unit 17 determines that the received frame is a request frame (Yes at Step S106), the path information setting unit 17 performs the path information setting process, which will be described later (Step S107). In contrast, if the path information setting unit 17 determines that the received frame is not a request frame (No at Step S106), the process at Step S103 is performed.

Path Information Setting Process

Figure 7:
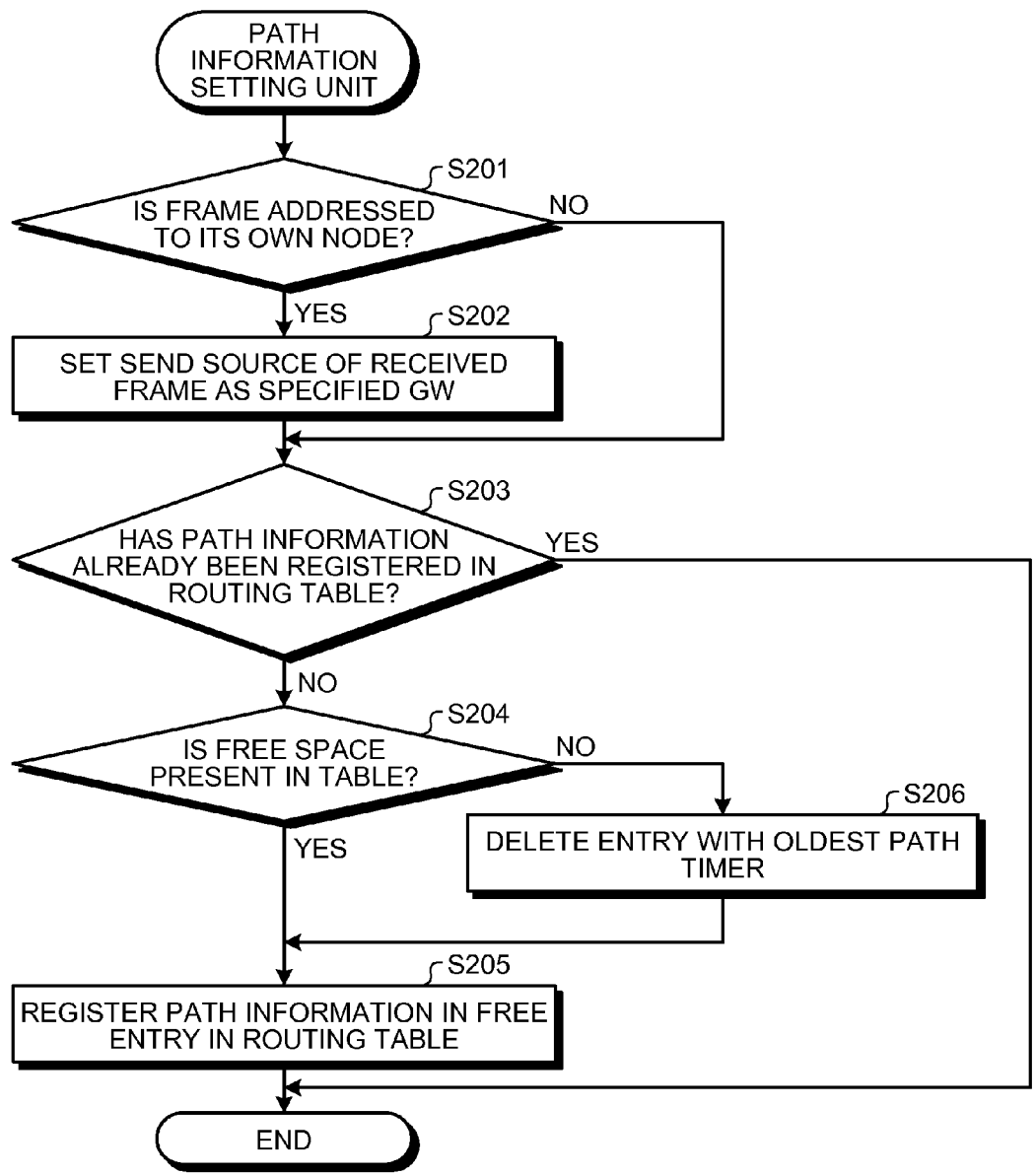
FIG. 7 is a flowchart illustrating the flow of a path information setting process according to the first embodiment.

FIG. 7 is a flowchart illustrating the flow of a path information setting process according to the first embodiment. This process is the process performed at Step S107 illustrated in FIG. 6.

As illustrated in FIG. 7, the path information setting unit 17 in the node 10 refers to the header or the like in the received frame that is determined to be the request frame and then determines whether the received frame is the frame addressed to its own node (Step S201).

If the path information setting unit 17 determines that the received frame is the frame addressed to its own node (Yes at Step S201), the path information setting unit 17 extracts a send source from the received frame and then registers the extracted send source in a specified GW in the routing table 11 (Step S202).

Then, the path information setting unit 17 determines whether the path information associated with the send source in the received frame has already been registered in the routing table 11 (Step S203). At this point, if the path information associated with the send source in the received frame has already been registered in the routing table 11 (Yes at Step S203), the path information setting unit 17 ends the process.

In contrast, if the path information associated with the send source in the received frame has not yet been registered in the routing table 11 (No at Step S203), the path information setting unit 17 determines whether free space is present in the routing table 11 (Step S204).

If the path information setting unit 17 determines that free space is present in the routing table 11 (Yes at Step S204), the path information setting unit 17 registers, in the free entry in the routing table 11, an entry for the GW device of the send source in the received frame (Step S205).

In contrast, if the path information setting unit 17 determines that free space is not present in the routing table 11 (No at Step S204), the path information setting unit 17 deletes the entry with the oldest path timer in the routing table 11 (Step S206) and then performs the process at Step S205. Specifically, the path information setting unit 17 deletes path information that indicates the path timer with the smallest value and that is not used for a long time and then registers a new entry.

Transfer Process

Figure 8:
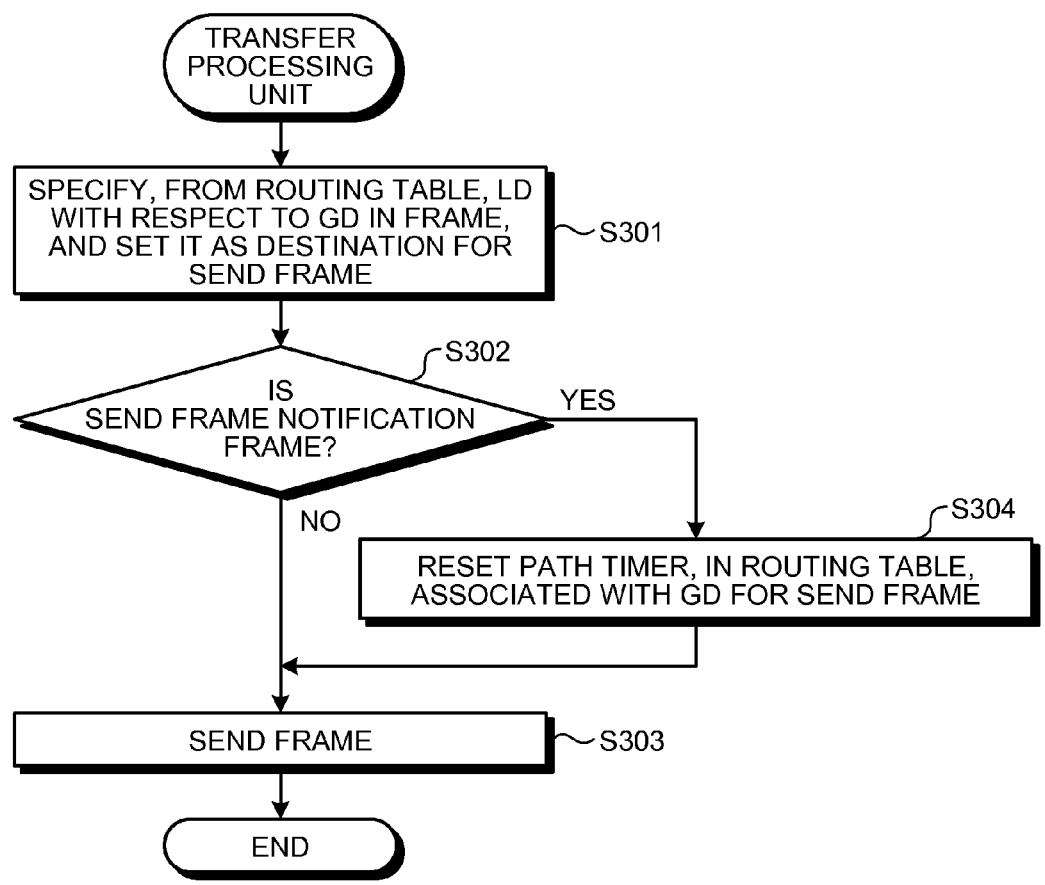
FIG. 8 is a flowchart illustrating the flow of a transfer process according to the first embodiment.

FIG. 8 is a flowchart illustrating the flow of a transfer process according to the first embodiment. This process is performed at Step S105 illustrated in FIG. 6.

As illustrated in FIG. 8, the transfer processing unit 15 in the node 10 performs the process at Step S301 by using the received frame, which is determined to be a survival check frame or determined to be sent to the other node, as a send frame that is to be sent to the subsequent destination. Specifically, the transfer processing unit 15 extracts the "GD" that is set in the header or the like in the received frame, specifies the "LD" with respect to the "GD" from the routing table 11, and sets the specified "LD" as the "LD" in the send frame (Step S301).

Subsequently, the transfer processing unit 15 determines whether the send frame is a notification frame (Step S302). If the transfer processing unit 15 determines that the send frame is not a notification frame (No at Step S302), the transfer processing unit 15 sends the send frame to the destination (Step S303).

In contrast, if the transfer processing unit 15 determines that the, send frame is a notification frame (Yes at Step S302), the transfer processing unit 15 resets the path timer in the entry, in the routing table 11, that is associated with the GW device that is set as the "GD" in the send frame (Step S304). Then, the transfer processing unit 15 performs the process at Step S303.

Transfer Process

Figure 9:
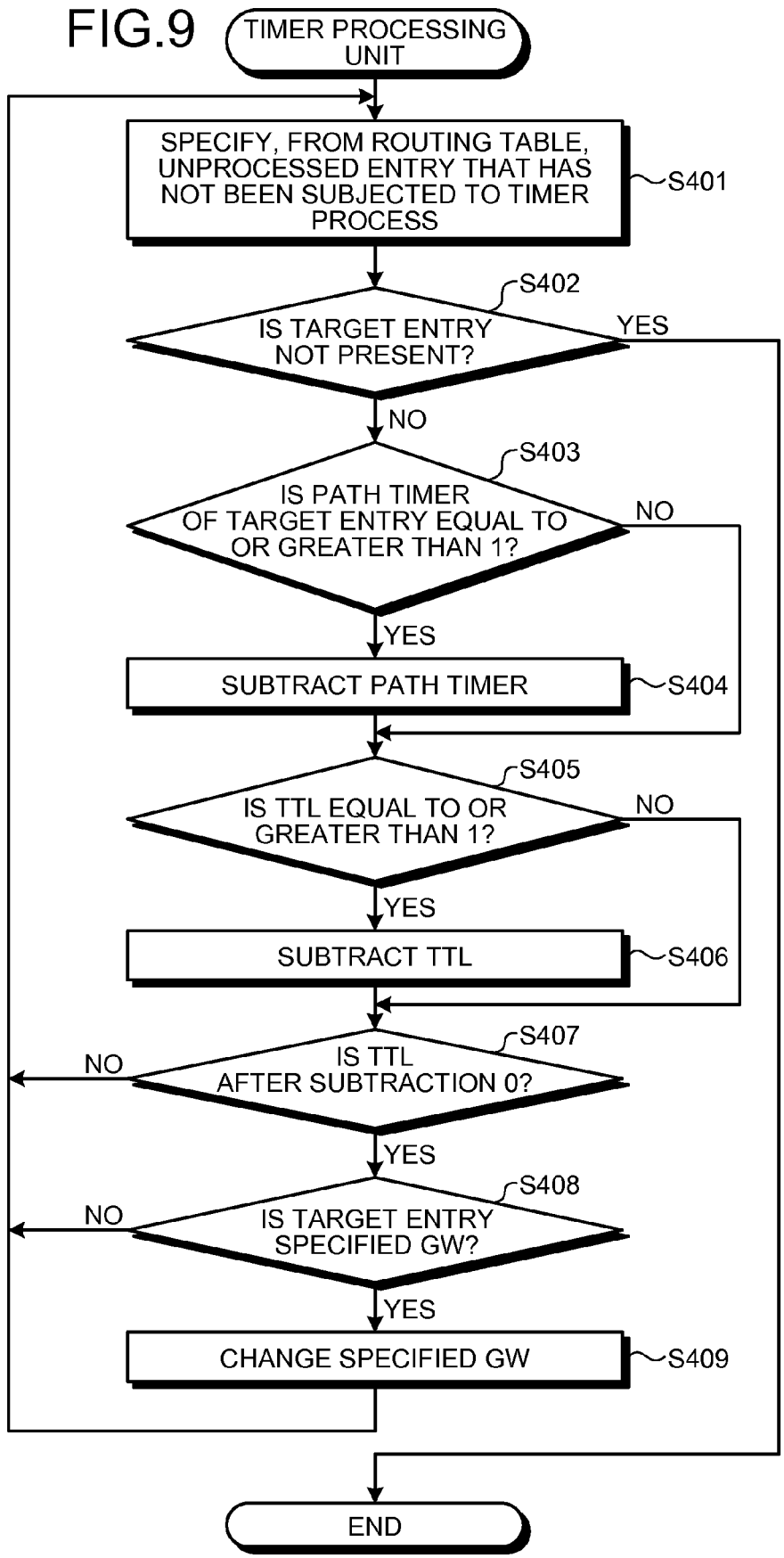
FIG. 9 is a flowchart illustrating the flow of a timer process according to the first embodiment.

FIG. 9 is a flowchart illustrating the flow of a timer process according to the first embodiment. As illustrated in FIG. 9, the timer processing unit 18 in the node 10 specifies, from the routing table 11, an unprocessed entry that has not been subjected to the timer process (Step S401). At this point, if the target entry is not present (Yes at Step S402), the timer processing unit 18 ends the process.

In contrast, if the target entry is present (No at Step S402), the timer processing unit 18 determines whether the path timer of the target entry is equal to or greater than 1 (Step S403). If the path timer is equal to or greater than 1 (Yes at Step S403), the timer processing unit 18 performs a subtraction on the path timer in the target entry (Step S404). If the path timer in the target entry is 0 (No at Step S403), the timer processing unit 18 performs the process at Step S405 without performing the process at Step S404.

Then, the timer processing unit 18 determines whether the TTL in the target entry is equal to or greater than 1 (Step S405). If the TTL in the target entry is equal to or greater than 1 (Yes at Step S405), the timer processing unit 18 performs a subtraction on the target TTL (Step S406). Furthermore, if the TTL in the target entry is 0 (No at Step S405), the timer processing unit 18 performs the process at Step S407 without performing the process at Step S406.

Thereafter, if the TTL after the subtraction is not 0 (Yes at Step S407), the timer processing unit 18 returns to the process at Step S401 and performs the process described above on the subsequent entry.

In contrast, if the TTL after the subtraction is 0 (No at Step S407), the timer processing unit 18 determines whether the target entry is an entry for a specified GW (Step S408). If the target entry is not an entry for a specified GW (No at Step S408), the timer processing unit 18 returns to the process at Step S401 and performs the process described above on the subsequent entry.

Furthermore, if the target entry is an entry for a specified GW (Yes at Step S408), after the timer processing unit 18 changes the target specified GW (Step S409), the timer processing unit 18 returns to the process at Step S401 and then performs the process described above on the subsequent entry.

Specific Example of a Path Update

In the following, an example of updating the routing table that stores therein nodes will be described with reference to FIGS. 10 to 14. It is assumed that the configuration of the wireless communication system is the same as that illustrated in FIG. 1. Furthermore, in FIGS. 10 to 14, the routing table may sometimes be referred to as an RT.

Figure 10:
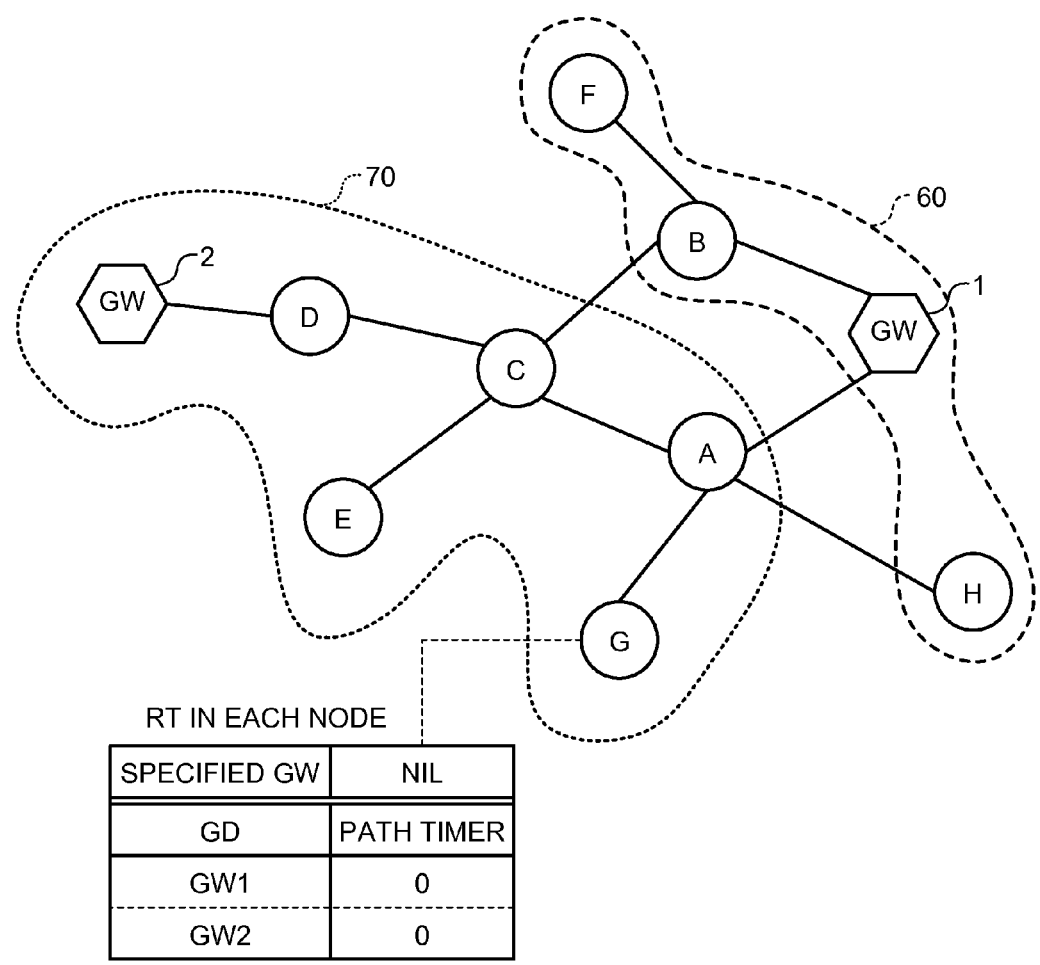
FIG. 10 is a schematic diagram illustrating a specific example of a path update.

FIG. 10 is a schematic diagram illustrating a specific example of a path update. As illustrated in FIG. 10, similarly to the wireless communication system illustrated in FIG. 1, the wireless communication system is a system that includes nodes, i.e., the node A to the node H, the GW device 1, and the GW device 2. Furthermore, the nodes connected by the solid line illustrated in FIG. 10 indicate that the nodes are located in the location in which communication is available by a single hop.

In this state, a group 60 indicates a region that includes therein nodes each of which acquires various kinds of data, such as control data or meter read data included in a request instruction, from the GW device 1. Similarly, a group 70 indicates a region that includes therein nodes each of which acquires various kinds of data from the GW device 2. Furthermore, in the routing table in each of the nodes, information indicating "specified GW=nil and (GD, path timer)=(GW 1, 0) and (GW 2, 0)" is registered as an initial state.

Figure 11:
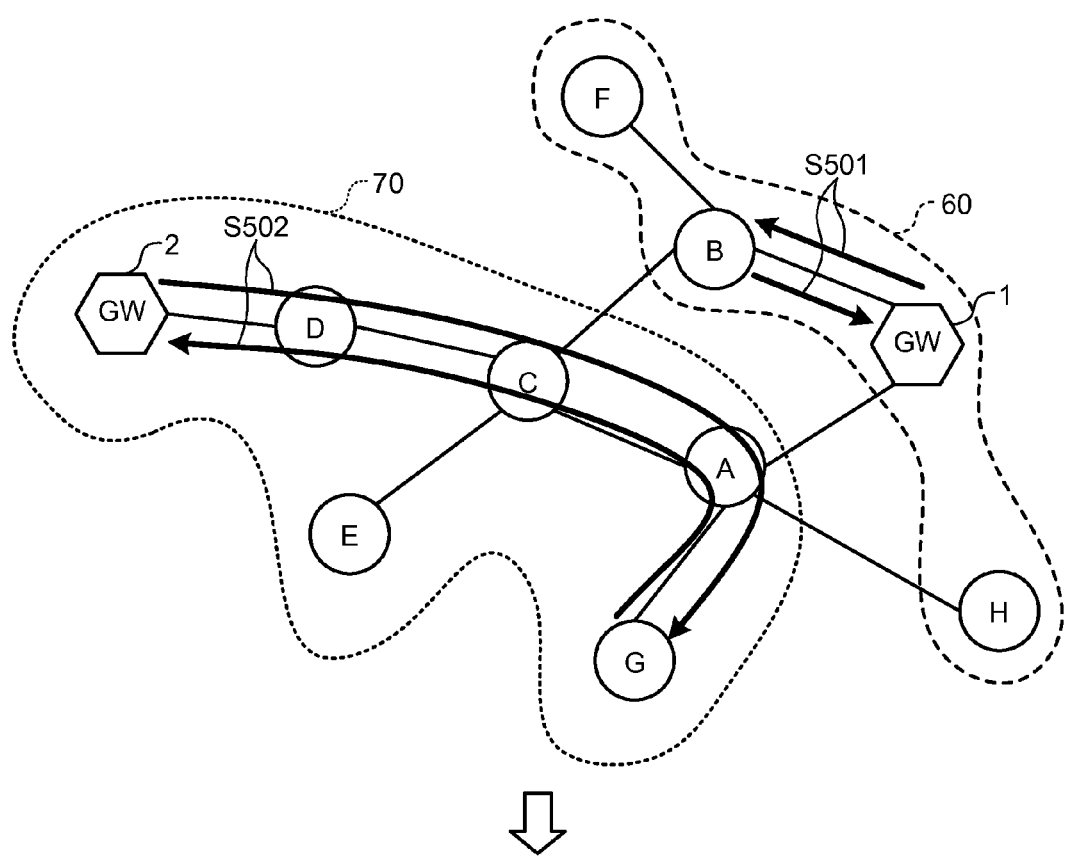
FIG. 11 is a schematic diagram illustrating an example in which path information is updated by a frame that is sent from a GW device 2 to a node G and a frame that is sent from a GW device 1 to a node B.

Then, a request frame whose destination is the node B is sent from the GW device 1 and a request frame whose destination is the node G is sent from the GW device 2. FIG. 11 is a schematic diagram illustrating an example in which path information is updated by a frame that is sent from the GW device 2 to a node G and a frame that is sent from the GW device 1 to the node B.

As illustrated in FIG. 11, the request frame that has been sent from the GW device 1 to the node B is directly received by the node B that is connected to the GW device 1 by a single hop. Then the node B sends a notification frame, as a response to the request frame, to the GW device 1 (Step S501).

Consequently, because the destination of the request frame is the node B itself, the node B registers the GW device 1, which is the send source of the request frame, in the specified GW. Furthermore, the node B sets, in the routing table, the path timer in the entry that stores therein the GW device 1 that is the destination of the notification frame and that is used as the "GD" to 100.

In contrast, as illustrated in FIG. 11, the request frame that has been sent from the GW device 2 to the node G reaches the node G via nodes each of which is connected by a single hop. Then, the notification frame sent from the node G reaches the GW device 2 via paths in the reverse order of the paths that are used to send the request frame (Step S502).

Specifically, the request frame that has been sent from the GW device 2 reaches the node G via the node D that is connected to the GW device 2, which is the send source, by a single hop; via the node C that is connected to the node B by a single hop; and via the node A that is connected to the node C by a single hop. Similarly, the notification frame that has been sent from the node G reaches the GW device 2 via the node A that is connected to the node G, which is the send source, by a single hop; via the node C that is connected to the node A by a single hop; and via the node D that is connected to the node C by a single hop.

Consequently, because the destination of the request frame is the node G itself, the node G registers the GW device 2, which is the send source of the request frame, as a specified GW. Furthermore, the node G sets, in the routing table, the path timer in the entry that stores therein information indicating that the GW device 2 that is the destination of the notification frame is used as the "GD" to 100. Furthermore, because the node A, the node C, and the node D has relayed the request frame and the notification frame, the node G sets the path timer in the entry that stores therein information indicating that the GW device 2 that is the destination of the notification frame is used as the "GD" to 100.

It is assumed that a request frame whose destination is the node H is sent from the GW device 1 after 10 minutes has elapsed since the state illustrated in FIG. 11. FIG. 12 is a schematic diagram illustrating an example in which the path information is updated by a frame that was sent from the GW device 1 to the node H from the state illustrated in FIG. 11.

As illustrated in FIG. 12, the request frame that has been sent from the GW device 1 to the node H reaches the node H via nodes each of which is connected by a single hop. Then, the notification frame that has been sent from the node H reaches the GW device 1 via paths in the reverse order of the paths that are used to send the request frame (Step S503).

Specifically, the request frame that has been sent from the GW device 1 reaches the node H via the node A that is connected to the GW device 1, which is the send source, by a single hop. Similarly, the notification frame that has been sent from the node H reaches the GW device 1 via the node A that is connected to the node H, which is the send source, by a single hop.

Consequently, because the destination of the request frame is the node H itself, the node H registers the GW device 1, which is the send source of the request frame, as a specified GW. Furthermore, the node H sets, in the routing table, the path timer in the entry that stores therein information indicating that the GW device 1 that is the destination of the notification frame is used as the "GD" to 100. Furthermore, because the node A relays the request frame and the notification frame, the node A sets the path timer in the entry that stores therein information indicating that the GW device 1 that is the destination of the notification frame is the "GD" to 100.

Furthermore, because each of the nodes does not send or receive a frame to or from the GW device 2 during this 10 minutes, 10 is subtracted from the value stored in the "path timer" in the entry, in the routing table, in which the "GD" is the "GW 2".

Figure 13:
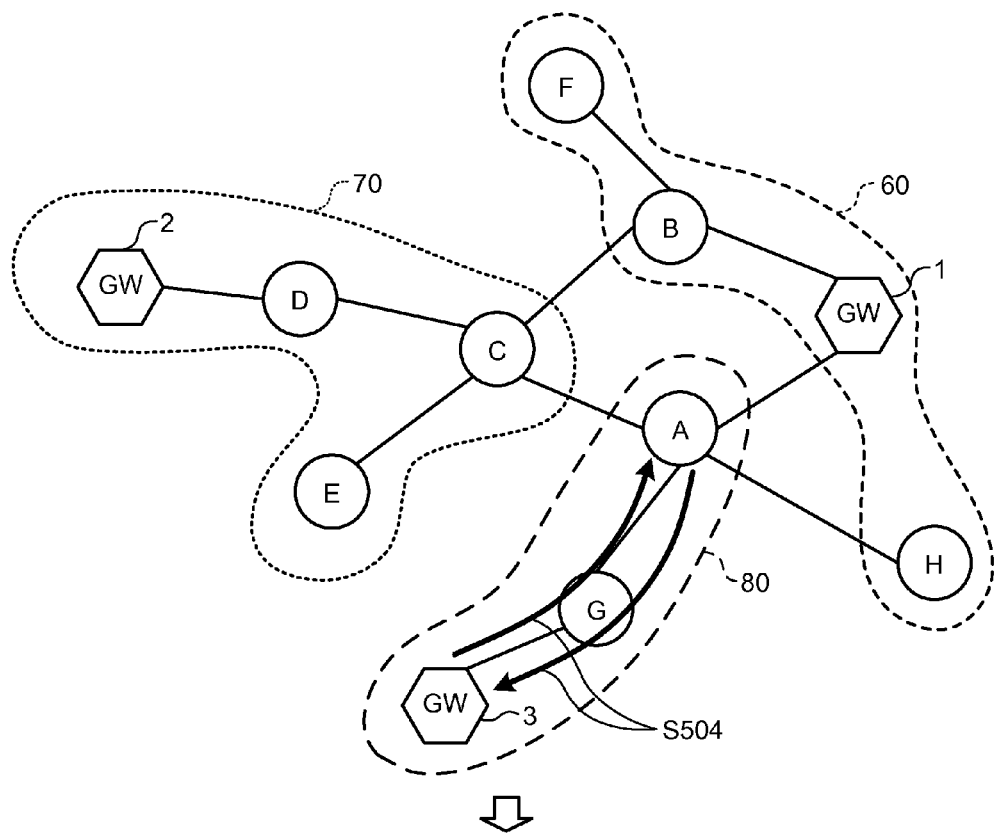
FIG. 13 is a schematic diagram illustrating an example in which the path information is updated by a frame that is sent from a GW device 3, which is added from the state illustrated in FIG. 12, to the node A.

It is assumed that, after another 10 minutes has elapsed, a request frame whose destination is the node A is sent from the GW device 3 that is newly added to the wireless communication system. FIG. 13 is a schematic diagram illustrating an example in which the path information is updated by a frame that is sent from the GW device 3, which is added from the state illustrated in FIG. 12, to the node A.

As illustrated in FIG. 13, the request frame that has been sent from the GW device 3 to the node A reaches the node A via the nodes each of which is connected by a single hop. Furthermore, the notification frame that has been sent from the node A reaches the GW device 3 via paths in the reverse order of the paths that are used to send the request frame (Step S504).

Specifically, the request frame sent by the GW device 3 reaches the node A via the node G that is connected to the GW device 3, which is the send source, by a single hop. Similarly, the notification frame that has been sent from the node A reaches the GW device 3 via the node G that is connected to the node A, which is the send source, by a single hop.

Consequently, because the destination of the request frame is the node A itself, the node A registers the GW device 3, which is the send source of the request frame, as a specified GW. Furthermore, the node A creates, in the routing table, an entry in which the GW device 3 that is the destination of the notification frame is used as the "GD". At this point, because the number of entries in the routing table reaches the upper limit, the node A deletes, instead of the specified GW, the entry that stores therein the "GW 2" with the smallest path timer. Then, the node A newly creates an entry in which the GW device 3 is used as the "GD" and then sets the path timer in the entry to 100.

Furthermore, because the node G relayed the request frame and the notification frame, the node G creates an entry in which the GW device 3 that is the destination of the notification frame is used as the "GD". Specifically, the node G deletes, instead of the specified GW in the routing table, the entry that stores therein the "GW 1" with the smallest path timer. Then, the node G newly creates an entry in which the GW device 3 is used as the "GD" and then sets the path timer in the entry to 100.

Furthermore, because each of the nodes does not send or receive a frame to or from the GW device 2 during this 10 minutes, 10 is further subtracted from the value stored in the "path timer" in the entry, in the routing table, in which the "GD" is the "GW 2".

Figure 14:
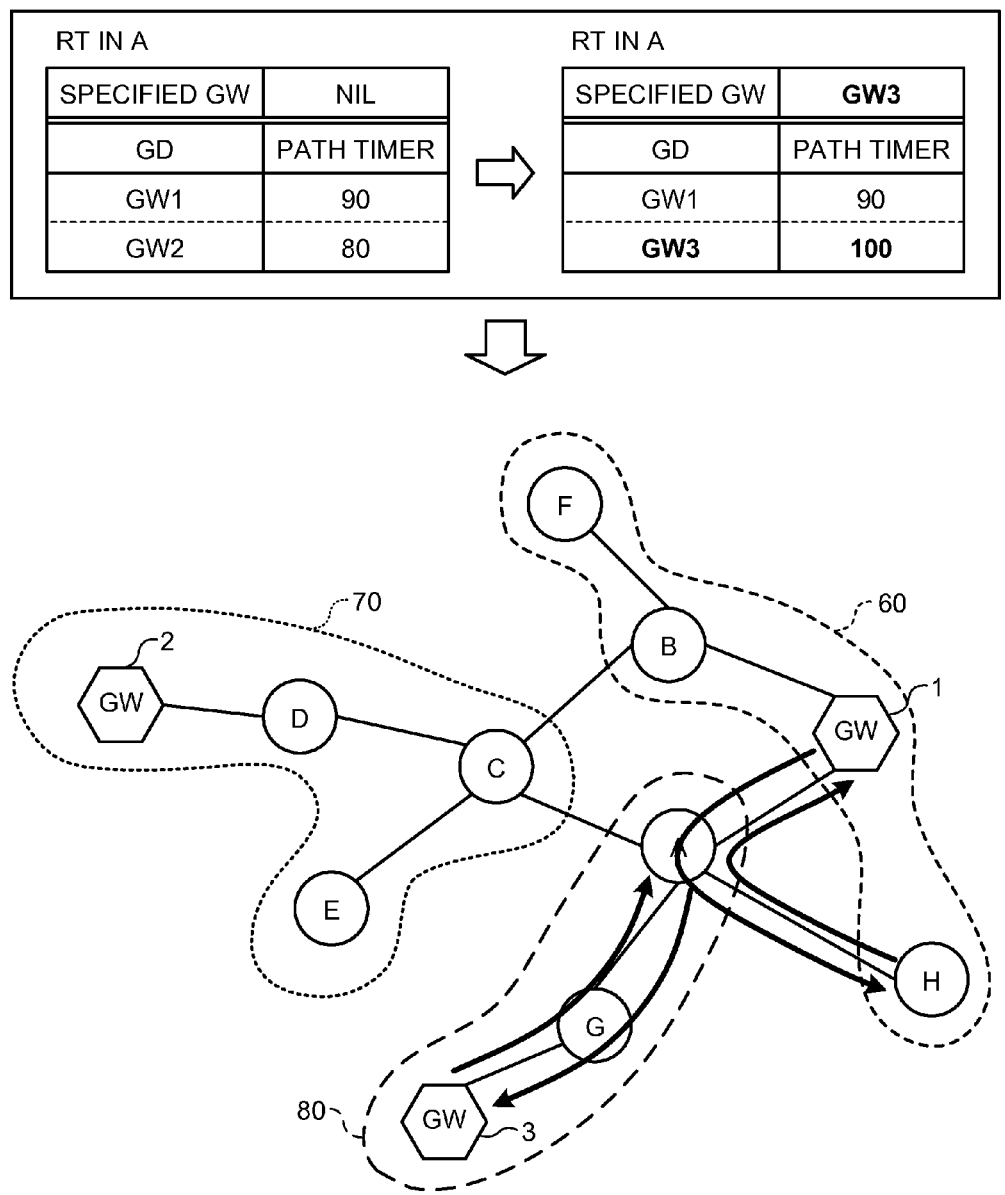
FIG. 14 is a schematic diagram illustrating the state in which the node A retains paths.

By updating a routing table in this way, each of the nodes can retain path information that is frequently used or that is recently used. FIG. 14 is a schematic diagram illustrating the state in which the node A retains paths.

As illustrated in FIG. 14, by performing a process from the state illustrated in FIG. 10 to the state illustrated in FIG. 13, the node A retains the path to the GW device 1 and the path to the GW device 3. Consequently, even when frame transmission from the GW device 1 to the node H has occurred, the node A can relay the frame without causing communication disconnection because these paths are recently used and thus the information thereof is retained in the routing table.

Specific Example of Alive Monitoring

Figure 15:
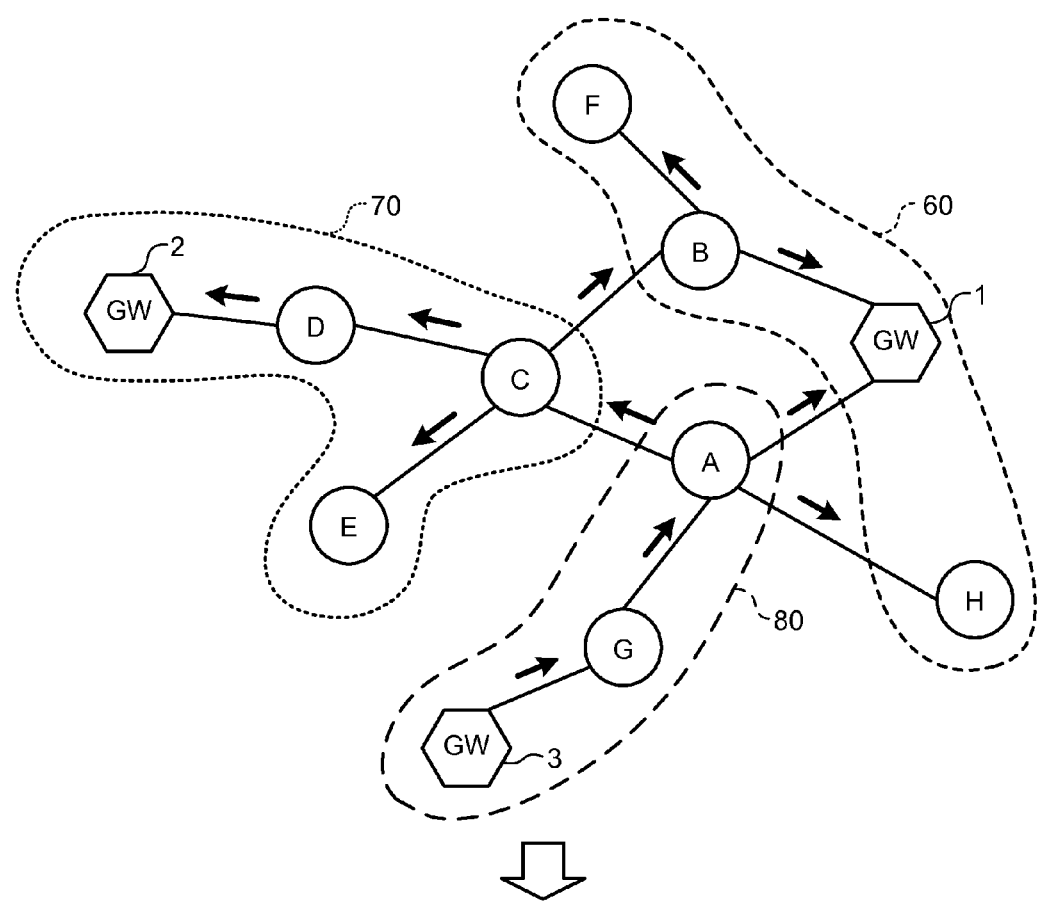
FIG. 15 is a schematic diagram illustrating alive monitoring.
Figure 16:
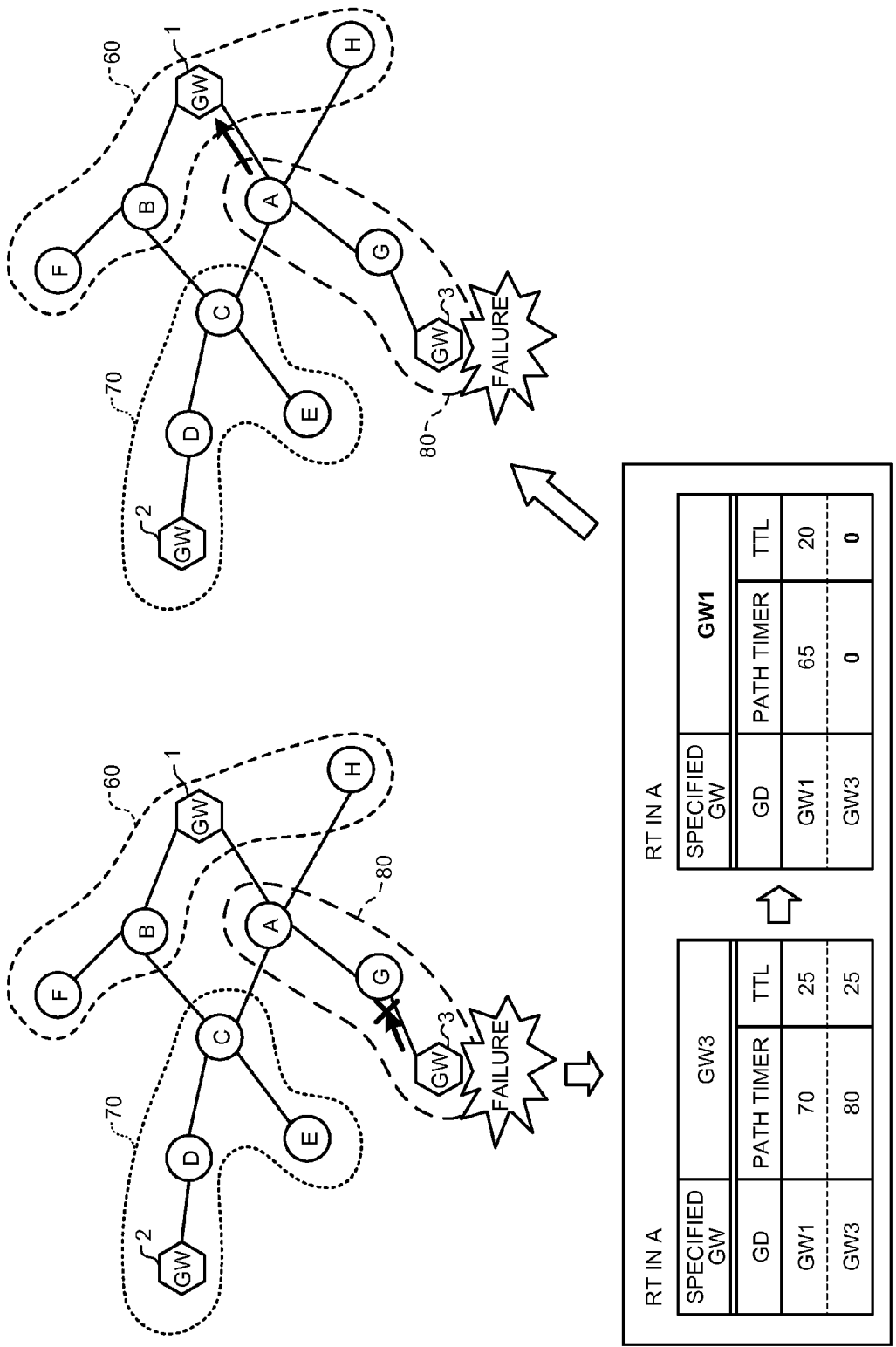
FIG. 16 is a schematic diagram illustrating the alive monitoring.

In the following, an example of updating a routing table by using alive monitoring between nodes will be described with reference to FIGS. 15 and 16. FIG. 15 and FIG. 16 are schematic diagrams each illustrating alive monitoring.

The wireless communication system illustrated in FIG. 15 has the same configuration as that illustrated in FIG. 13 and is a system that includes the nodes, i.e., the node A to the node H, the GW device 1, the GW device 2, and the GW device 3. Furthermore, the nodes or the like connected by the solid line illustrated in FIG. 15 are located in the location in which communication is available by a single hop.

Furthermore, the group 60 indicates a region that includes therein nodes each of which acquires various kinds of data, such as control data or meter read data included in a request instruction, from the GW device 1. Similarly, the group 70 indicates a region that includes therein nodes each of which acquires various kinds of data from the GW device 2. Furthermore, a group 80 indicates a region that includes therein nodes each of which acquires various kinds of data from the GW device 3.

It is assumed that information indicating "specified GW=GW 3 and (GD, path timer, TTL)=(GW 1, 70, 25) and (GW 3, 80, 25)" is stored in, for example, the routing table in the node A.

In this state, the GW device 3 periodically sends a survival check frame that monitors alive of a node. The arrow illustrated in FIG. 15 indicates the flow of the survival check frame that has been sent from the GW device 3 and is transmitted to nodes that are connected with each other by a single hop.

When each of the nodes does not receive the survival check frame sent from the GW device 3 for a certain time period, each of the nodes updates the corresponding routing table. As illustrated in FIG. 16, the transmission of the survival check frame sent from the GW device 3 is stopped due to a failure occurring in the GW device 3.

For example, because the transmission of the survival check frame sent from the GW device 3 is stopped, the node A registers "0" in the "path timer" and the "TTL" in the entry, in the routing table, that stores therein information indicating that the "GW 3" is the "GD". Furthermore, because the GW 3 is registered as a specified GW, the node A updates the GW 3 to the GW 1 for the specified GW. Thereafter, the node A autonomously sends data to the GW device 1. By doing so, even if a new entry needs to be registered, the node A can register the new entry by deleting the entry for the GW device 3 that is currently failed.

With the embodiment described above, when each of the nodes registers a new entry, each of the nodes can store the new entry by deleting an old entry from the routing table. Furthermore, even if free space requested by a GW device is not present in the routing table in the node, because each of the nodes can interchange entries in its own routing table, each of the nodes can send a reply without causing communication disconnection.

Furthermore, because the path timer is periodically updated, an interchange of the corresponding path is less likely to occur. Consequently, it is possible to construct a stable path due to an exchange of a HELLO message. Furthermore, even when a GW device has failed, a node can automatically change the destination GW after a predetermined time period has elapsed. Furthermore, the entry that stores therein the failed GW becomes the target for the interchange and thus unnecessary communication load from the node can be suppressed.

[b] Second Embodiment

In the above explanation, a description has been given of the embodiment according to the present invention; however, the embodiment is not limited thereto and can be implemented with various kinds of embodiments other than the embodiment described above. Therefore, another embodiment will be described below.

Wireless Network Quality

The "quality" stored in an entry in a routing table is a value that indicates the quality of a path from its own node to a destination node. For example, a value, such as reception electric field intensity, may also be used for the "quality". Furthermore, it may also possible to use the degree of reach, such as the ratio of the number of frames whose response can be checked to the total number of frames that have been sent to the destination A.

Use Frequency

In the embodiment described above, a description has been given of an example in which a "path timer" that is reset when a path is used and from which the elapsed time is subtracted is used as an index that indicates the use frequency of path information; however, the embodiment is not limited thereto. For example, a "path timer" to which the elapsed time is added may also be used. In such a case, as the value of the path timer is decreased, a use frequency is increased. Furthermore, a value to be added to the timer or to be subtracted from the timer may also arbitrarily be set.

Furthermore, for another example, it may also possible to use a method of managing the most recently used path. Specifically, nodes are managed by creating, in each of the entries in a routing table, an item that indicates the order of paths recently used and sequentially ordering the entries. Then, the node that is used for the path is set to a first node. Furthermore, if a first node, a second node, and the subsequent nodes have already been set in the routing table, the order of the nodes is shifted by one and then the latest node is registered in a first node that becomes free due to the shift. If the number of entries reaches the upper limit, the node is interchanged with the last node in the routing table.

Furthermore, for another example, it may also possible to use the number of paths that are used. For example, for a node, by counting the number of times a frame to be send to a GD is transmitted or transferred per unit time and then, it is determined that the use frequency is higher as the counted value is increased. If the number of entries reaches the upper limit, the node is interchanged with the node with the lowest use frequency.

Update Timing of a Path Timer

In the embodiment described above, a description has been given of an example in which a node subtracts a path timer. If the node receives a notification frame whose destination is a GD that is registered in an entry in a routing table, the node adds a value to the path timer in the entry. At this point, the node may also reset an initial value or may also add a predetermined value.

Furthermore, in the embodiment described above, a description has been given of an example in which each of the nodes sets or updates a path timer when the node receives or relays a notification frame; however, the embodiment is not limited thereto. For example, each of the nodes may also set or update a path timer when the node receives or relays a request frame.

Path Information on a Downlink

In the embodiment described above, a description has been given of an example in which each of the nodes retains path information on an uplink addressed to a GW device. However, it is assumed that each of the nodes uses, for path information on a downlink starting from a GW device that is the send source, paths in the reverse order of the paths that are used to send path information on the uplink.

System

Of the processes described in the embodiment, the whole or a part of the processes that are mentioned as being automatically performed can also be manually performed, or the whole or a part of the processes that are mentioned as being manually performed can also be automatically performed using known methods. Furthermore, the flow of the processes, the control procedures, the specific names, and the information containing various kinds of data or parameters indicated in the above specification and drawings can be arbitrarily changed unless otherwise stated.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. Furthermore, all or any part of the processing functions performed by each device can be implemented by a CPU and by programs analyzed and executed by the CPU or implemented as hardware by wired logic.

According to an aspect of an embodiment of the present invention, an advantage is provided in that it is possible to suppress the degradation of the quality of wireless communication.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus comprising:
a memory configured to store therein a first destination as a specified destination to which metering data is to be sent, and to store each piece of path information on a plurality of destinations including the first destination by associating with a path timer which counts down an elapsed time showing a use frequency of the path information; and
a processor connected to the memory wherein the processor executes a process comprising:
sending, when a request frame requesting the metering data destined for the wireless communication apparatus is received from the first destination, the metering data to the first destination and updating the path timer to an initial value, the path timer being in association with first path information on the first destination;
setting, when a request frame requesting the metering data destined for the wireless communication apparatus is received from a second destination different from the first destination, the second destination as the specified destination and determining whether second path information on the second destination is stored in the memory;
upon determination that the second path information is stored in the memory, updating the path timer associated with the second destination to the initial value;
upon determination that the second path information is not stored in the memory, determining whether the memory has free space; and
upon determination that the memory has free space, storing the second path information in the memory, and upon determination that the memory has no free space, deleting among the path information stored in the memory, path information indicating the path timer with a smallest value.

2. The wireless communication apparatus according to claim 1, wherein the process further comprises:
determining, when the request frame requesting the metering data destined for the wireless communication apparatus is received from the first destination, whether the first path information is stored in the memory, and upon determination that the first path information is not stored in the memory, storing the first path information in the memory by deleting among the path information stored in the memory, the path information indicating the path timer with a smallest value.

3. The wireless communication apparatus according to claim 1, wherein the process further comprises: setting, when a survival check frame indicating survival of a third device that is connected by an ad hoc network is not received from the third device for a predetermined time period, a minimum value indicating unavailability of third path information to the use frequency associated with the third path information whose destination is the third device.

4. A wireless communication method comprising:
storing, in a memory, therein a first destination as a specified destination to which metering data is to be sent, and storing, in the memory, therein each piece of path information on a plurality of destinations including the first destination by associating with a path timer which counts down an elapsed time showing a use frequency of the path information;

sending, when a request frame requesting metering data destined for a wireless communication apparatus is received from a first destination, the metering data to the first destination and updating a path timer to an initial value, the path timer being in association with first path information on the first destination;

setting, when a request frame requesting the metering data destined for the wireless communication apparatus is received from a second destination different from the first destination, the second destination as a specified destination and determining whether second path information on the second destination is stored in the memory;

upon determination that the second path information is stored in the memory, updating the path timer associated with the second destination to the initial value;

upon determination that the second path information is not stored in the memory, determining whether the memory has free space; and upon determination that the memory has free space, storing the second path information in the memory, and upon determination that the memory has no free space, deleting among the path information stored in the memory, path information indicating the path timer with a smallest value.

5. A non-transitory computer-readable recording medium having stored therein a wireless communication program that causes a wireless communication apparatus to execute a process comprising:

storing, in a memory, therein a first destination as a specified destination to which metering data is to be sent, and storing, in the memory, therein each piece of path information on a plurality of destinations including the first destination by associating with a path timer which counts down an elapsed time showing a use frequency of the path information;

sending, when a request frame requesting metering data destined for a wireless communication apparatus is received from a first destination, the metering data to the first destination and updating a path timer to an initial value, the path timer being in association with first path information on the first destination;

setting, when a request frame requesting the metering data destined for the wireless communication apparatus is received from a second destination different from the first destination, the second destination as a specified destination and determining whether second path information on the second destination is stored in the memory;

upon determination that the second path information is stored in the memory, updating the path timer associated with the second destination to the initial value;

upon determination that the second path information is not stored in the memory, determining whether the memory has free space; and upon determination that the memory has free space, storing the second path information in the memory, and upon determination that the memory has no free space, deleting among the path information stored in the memory, path information indicating the path timer with a smallest value.

6. A wireless communication system comprising:

a plurality of wireless communication apparatuses configured to be connected by an ad hoc network, wherein each of the wireless communication apparatuses includes, a memory configured to store therein a first destination as a specified destination to which metering data is to be sent, and to store each piece of path information on a plurality of destinations including the first destination by associating with a path timer which counts down an elapsed time showing a use frequency of the path information; and a processor connected to the memory wherein the processor executes a process including, sending, when a request frame requesting the metering data destined for a wireless communication apparatus is received from the first destination, the metering data to the first destination and updating the path timer to an initial value, the path timer being in association with first path information on the first destination;

setting, when a request frame requesting the metering data destined for the wireless communication apparatus is received from a second destination different from the first destination, the second destination as the specified destination and determining whether second path information on the second destination is stored in the memory;

upon determination that the second path information is stored in the memory, updating the path timer associated with the second destination to the initial value;

upon determination that the second path information is not stored in the memory, determining whether the memory has free space; and upon determination that the memory has free space, storing the second path information in the memory, and upon determination that the memory has no free space, deleting among the path information stored in the memory, path information indicating the path timer with a smallest value.

* * * * *